(12) United States Patent
Cravero et al.

(10) Patent No.: US 7,641,447 B2
(45) Date of Patent: Jan. 5, 2010

(54) REMOVABLE SENSOR SUPPORT FOR A HOLLOW-ROTOR HELICOPTER

(75) Inventors: Gerard Cravero, Marseilles (FR); Louis LeBlanc, Pelissanne (FR); Jean-Marc Besson, Salon de Provence (FR)

(73) Assignee: Eurocopter, Marignane (FR)

( * ) Notice: Subject to any disclaimer, the term of this patent is extended or adjusted under 35 U.S.C. 154(b) by 519 days.

(21) Appl. No.: 11/594,192

(22) Filed: Nov. 8, 2006

(65) Prior Publication Data

US 2007/0166164 A1 Jul. 19, 2007

(30) Foreign Application Priority Data

Nov. 9, 2005 (FR) .................................. 05 11403

(51) Int. Cl.
*B64C 27/32* (2006.01)

(52) U.S. Cl. .................................................. 416/244 R

(58) Field of Classification Search ............. 416/244 R; 248/592

See application file for complete search history.

(56) References Cited

U.S. PATENT DOCUMENTS

| 4,348,956 | A | | 9/1982 | Schmidlin et al. |
| 4,705,491 | A | * | 11/1987 | Andersson .................. 464/167 |
| 5,461,796 | A | | 10/1995 | Jalaguier et al. |
| 6,200,225 | B1 | * | 3/2001 | Hobaugh, II ................. 464/167 |
| 6,830,227 | B2 | * | 12/2004 | Nakatani ................. 248/354.3 |
| 6,920,893 | B2 | * | 7/2005 | Rokkjaer .................... 137/322 |

* cited by examiner

*Primary Examiner*—Ninh H Nguyen
(74) *Attorney, Agent, or Firm*—Young & Thompson (57) ABSTRACT

The present invention relates to a support (20, 24, 26) for a stationary article surmounting a helicopter rotor (11), which support comprises a hollow structure presenting a longitudinal axis (25); the hollow structure comprises two hollow parts (20, 24) of elongate shape along said longitudinal axis that are designed to be engaged one in the other and to be mutually stressed in twisting along said common longitudinal axis.

19 Claims, 4 Drawing Sheets

Fig.6

REMOVABLE SENSOR SUPPORT FOR A HOLLOW-ROTOR HELICOPTER

The present invention relates to a (removable) support for supporting a stationary article or device, in particular a sensor such as a sight, for use in a helicopter having a hollow rotor, and the invention also relates to a helicopter including such a support, and to a method of mounting said support on such a helicopter rotor.

FIELD OF THE INVENTION

The technical field of the invention is that of manufacturing helicopters.

In the present application, the term "helicopter" should be understood broadly to cover any rotary-wing aircraft or rotorcraft.

In the present application, the term "stationary", in particular in expressions such as "stationary article" or "stationary sensor" means that the article or sensor is not constrained to rotate together with the helicopter rotor or is not connected or coupled in rotation with said rotor; thus, the stationary article may be stationary or movable relative to the fuselage of the helicopter, for example it may be movable in rotation about the axis of rotation of the rotor, but in a manner that is independent from the rotation of the rotor.

BACKGROUND OF THE INVENTION

It is known to fit a helicopter with a sight—or vision system—that is located above the main lift and advance rotor of the helicopter, as described in particular in U.S. Pat. Nos. 4,275,992, 4,447,023, and 5,461,796.

The third of those patents describes a gun-sight device suspended from the top of a mast supporting the sight; the mast extends inside the hollow shaft for driving the rotor in rotation, and its bottom end is secured to the bottom of the case of the main gearbox (MGB).

Such a sight-support mast is generally hollow and receives electric cables or harnesses and/or fluid-transport ducts for transporting a cooling fluid, for the purpose of powering the vision system and conveying signals between the vision system and the cockpit, and also for cooling the optoelectronic components of the sight.

OBJECTS AND SUMMARY OF THE INVENTION

An object of the present invention is to propose such a mast or sight support that is easy to mount and to remove in order to facilitate maintenance operations on the supported article, the rotor, or the above-mentioned ducts or cables.

An object of the invention is to propose a removable support for a sensor located above the main rotor of a helicopter, the support providing improved ability to withstand vibration.

An object of the invention is to provide improved methods of mounting and/or removing said support.

An object of the invention is to propose a hollow support for a stationary article, the support extending through a hollow shaft and/or hub of a helicopter rotor, which support is improved and/or. remedies, at least in part, the shortcomings or drawbacks of prior art sight-support masts.

Thus, the invention applies in particular to an elongate support for a stationary article or device located above a helicopter rotor that includes a hollow shaft, which support comprises a hollow structure presenting a longitudinal axis; said hollow structure is generally designed to extend, at least in part, inside the hollow shaft used for driving the rotor, said shaft extending at least in part inside a main gearbox (MGB) connecting the rotor to an engine; the hollow structure is generally also designed to receive electric cables or "fluid" ducts; the support or its hollow structure generally presents a top end designed to receive the stationary article, and a bottom end fitted with means for securing the support to the helicopter, and in particular to the casing of the MGB.

According to an aspect of the invention, such a support is provided in which the hollow structure comprises two hollow parts of elongate shape along said longitudinal axis, in particular of tubular or cylindrical shape, which parts are engaged one in the other, and are mutually stressed in twisting about said common longitudinal axis.

In the meaning of the present application, the term "part" designates either a single part, or a plurality of parts that are rigidly connected together.

In a preferred embodiment, a first of the two hollow parts has two twist abutments designed to co-operate respectively with two complementary twist abutments belonging to the second hollow part that is secured to the fuselage or some other stationary portion of the aircraft such as the casing of the MGB, in an assembled configuration of the support in which the two parts are mutually stressed in twisting and are mutually held together by (contact) friction via the twist abutments.

The support or its hollow structure further comprises return means designed to cause relative turning of the two twist abutments of at least one of the two parts towards a second mutual configuration of the two parts referred to as a free configuration or state in which the twist abutments can no longer co-operate with said complementary twist abutments.

In a particular embodiment of the invention, the bottom of the removable mast comprises said first hollow part—presenting a longitudinal axis—with two projections, ribs, or splines provided on its outside portion, each having two respective side faces forming said twist abutments; the abutments are spaced apart along the longitudinal axis, and at least a portion of said return means is provided between these two abutments.

The two complementary twist abutments with which the twist abutments of the first part can co-operate are then formed by the side faces of at least one depression, groove, or slot provided in the inside portion of the (tubular) second hollow part or sleeve which is suitable for receiving the first hollow part, and a portion of said return means is provided between these two complementary abutments.

In another particular embodiment of the invention, the mast for supporting a stationary article comprises:
- a portion that is separable from the fuselage and the rotor of the helicopter, which portion has a first hollow part that extends along the axis of rotation of the rotor and that receives or houses at least one cable fitted with a first releasable electrical connector and a duct fitted with a releasable first fluid coupling; said first hollow part presents on its outside face both a first set of splines and a second set of splines spaced apart from the first set by a first distance measured along the longitudinal axis, and also a first tubular portion extending between the two sets of splines and presenting first elasticity in twisting (or rotation) about the longitudinal axis;
- a portion that is (permanently) connected to the fuselage of the helicopter, including a second hollow part that extends along the axis of rotation of the rotor and that receives, or at least houses, a cable fitted with a second releasable electrical connector and a duct fitted with a second releasable fluid coupling; said second hollow part presenting on its inside face both a third set of splines and a fourth set of splines spaced apart from the third set by a second distance measured along the longitudinal axis, together with a second tubular portion extending between said two sets of splines and presenting second elasticity in twisting (or rotation) about the longitudinal axis;

said first and second distances being equal or close together so as to enable the first and third sets of splines to engage mutually, and also so as to enable the second and fourth sets of splines to engage mutually, when in said configuration of mutual stress between the first and second parts;

the respective diameters of the two parts and their sets of splines, the lengths of said parts and of the splines, and also the sections (profiles) and angular offsets of the splines being designed to enable the first part to engage in the second part by the first set of splines sliding freely through the third and fourth sets of splines;

the angular offset (or orientation) of at least some of the splines in the second set of splines preventing the second set of splines from sliding through the fourth set of splines so long as said first and second tubular portions are not (elastically) deformed—and thus stressed—in twisting about their common longitudinal axis by a value that serves to compensate for said offset; and said connectors are designed to provide electrical continuity of a circuit once they are mutually engaged, and the couplings are similarly designed to provide leaktight coupling between two fluid circuit portions.

The removable bottom end of the mast can thus be held—without slack—securely in the sheath that receives it by the effect of friction forces between the two pairs of surfaces of the abutments that are held pressed together mutually in pairs by the return forces that result from the twisting stresses on the elastically deformable portions of the two hollow parts.

This retention makes it possible to provide a connection that behaves like a fixed support, but that can be taken apart by forcibly extracting the bottom of the mast from the sheath.

This connection is insensitive to the vibration that occurs on board the aircraft; this connection also limits the amount of vibration to which the sight secured to the top of the mast is subjected; this connection withstands well any impulses that might arise as a result of sudden accelerations and decelerations during rotary scanning movements of the optoelectronic equipment in the sight.

According to other preferred characteristics of the invention:

the first elasticity is greater than the second elasticity so as to favor deformation in twisting of the first part when it is engaged by force in the second part; this can be achieved by using different materials —e.g. steel and aluminum —respectively for manufacturing the second tubular part and the first tubular part;

a mechanical angular key or index is incorporated in the two hollow parts so as to allow them to be engaged mutually in only a single determined relative angular position, thus ensuring proper angular orientation of the mast and of the device that it supports, relative to the helicopter; this indexing can be obtained in particular by providing in each set of splines one spline that is of a width that is different from that of the other splines in the set in question;

the splines are elongate in shape along the longitudinal axis; at least one angularly offset spline of the second set of splines presents a chamfer at its longitudinal end closer to the splines of the second set.

In another aspect, the invention provides a method of mounting a support as defined above and as described herein, the method comprising engaging the first hollow part by force in the second hollow part by exerting a thrust force along the common longitudinal axis of these parts while bearing against the rotor, and then, once mutual engagement of two connectors or couplings respectively connected to these two parts is detected, ceasing to apply the thrust force.

BRIEF DESCRIPTION OF THE DRAWINGS

Other aspects, characteristics, and advantages of the invention appear from the following description which refers to the accompanying drawings that show preferred embodiments of the invention without any limiting character.

FIGS. 3 to 7 relate to a simplified embodiment of the means for connecting together the two portions of a sensor-support mast by prestress in twisting; FIG. 3 is a simplified perspective view of two parts in alignment ready for mutual engagement; FIGS. 4 and 5 are end views of the two parts shown in FIG. 3 respectively seen looking along arrows IV, and V-V; FIG. 6 is a perspective view showing partial mutual engagement between the two parts, prior to applying stress, while

FIGS. 8 and 9 are diagrams showing another embodiment of the two hollow parts of a sensor-support mast, corresponding to the embodiment of FIGS. 1 and 2; FIG. 8 is a perspective view of the two parts in alignment for mutual engagement, while FIG. 9 is a cutaway side view showing the partial mutual engagement of the two hollow parts while not stressed in twisting.

MORE DETAILED DESCRIPTION

Figure 1:
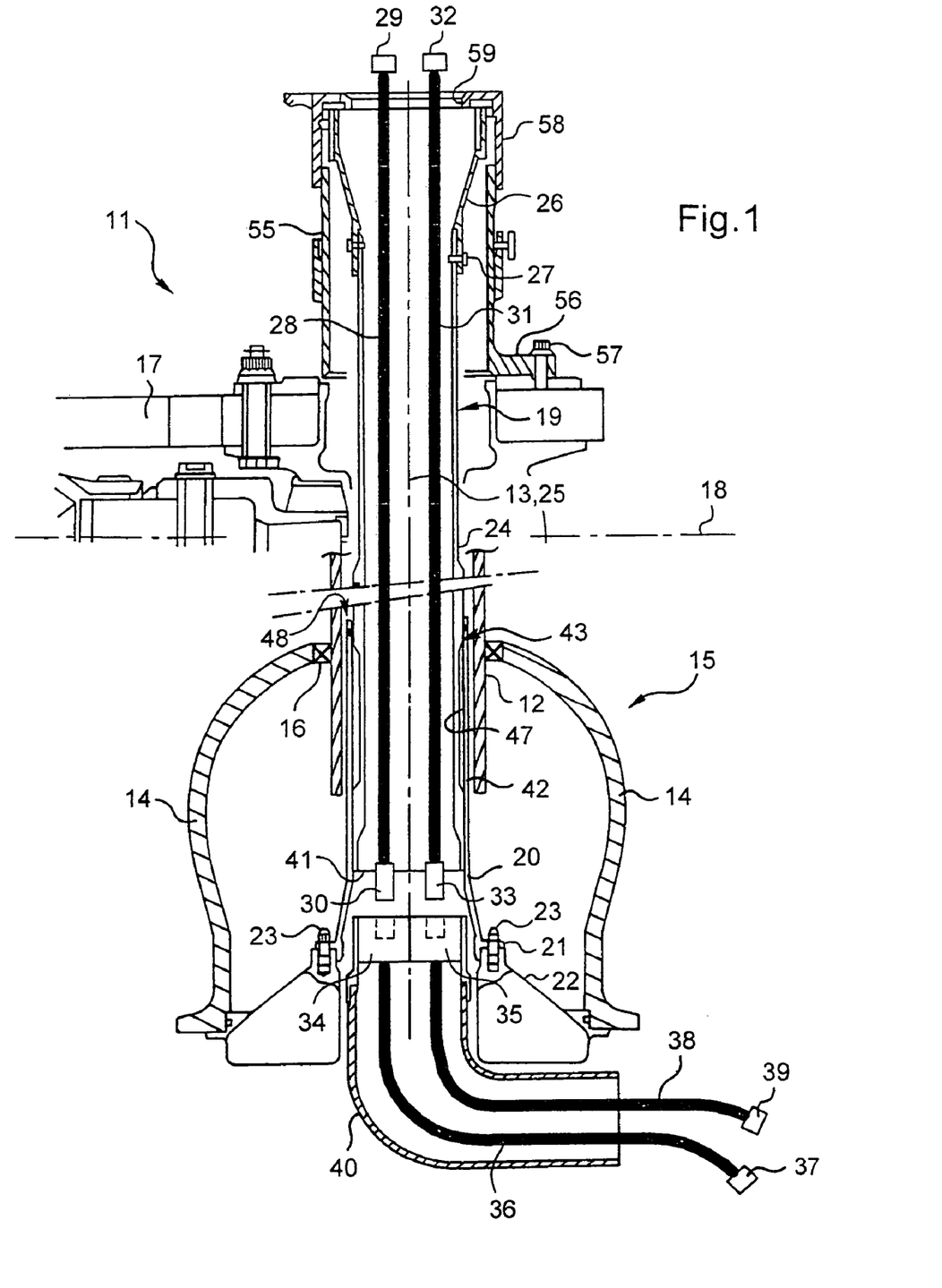
FIG. 1 is a fragmentary diagrammatic cross-section view of a portion of a helicopter including a gearbox and a hollow shaft for driving the rotor, a sensor-supporting mast being engaged in the shaft; this figure also shows the main component of tooling for mounting the mast.
Figure 2:
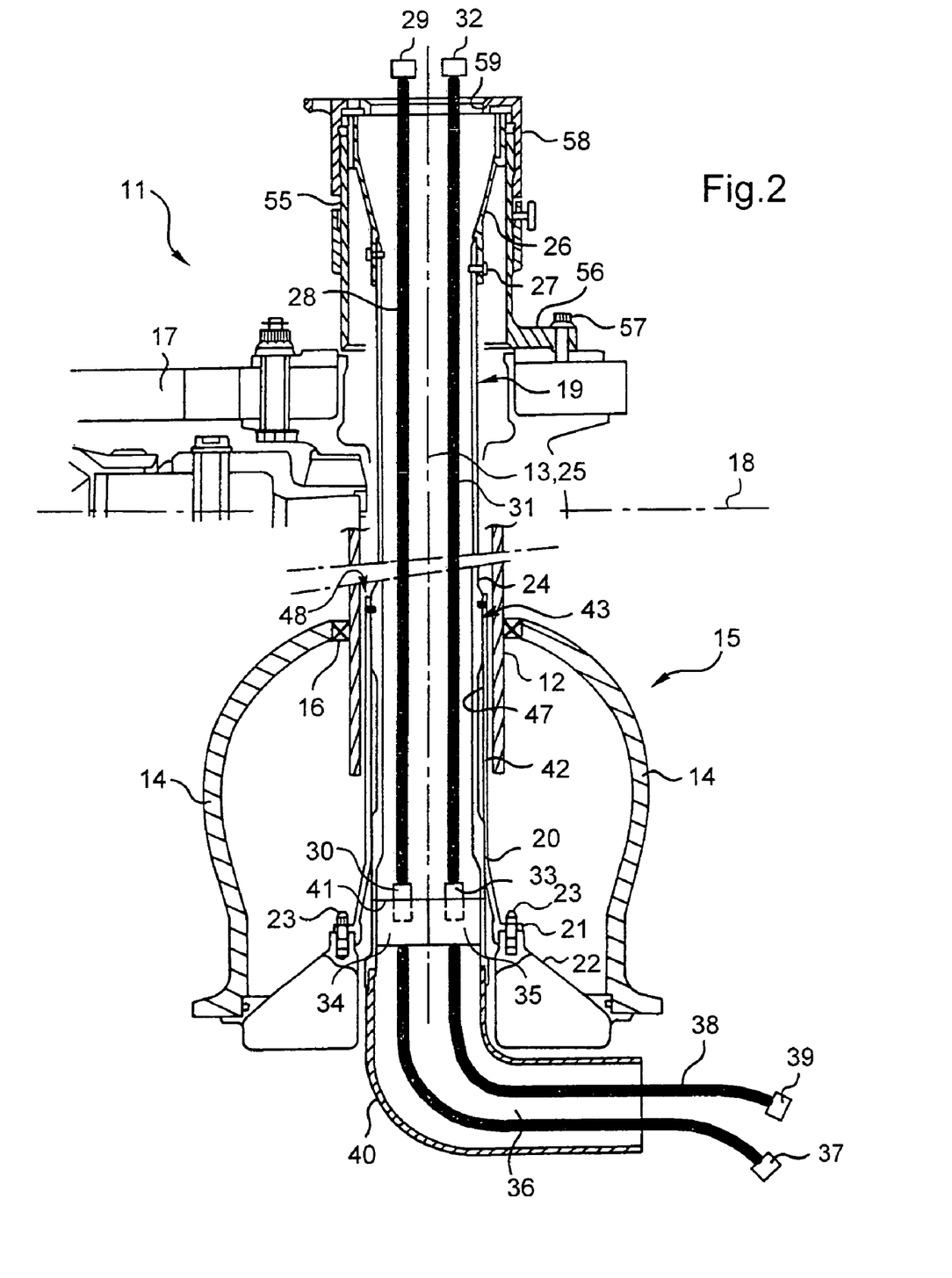
FIG. 2 is a diagrammatic cross-section similar to FIG. 1, in which the sensor-support mast is in its operating position.

With reference to FIGS. 1 and 2 in particular, the invention relates to a helicopter having a rotor 11 that is rotated about a substantially vertical axis 13 by a hollow shaft 12 extending along said axis.

The shaft 12 extends through an orifice formed in the wall 14 of a gearbox 15; a ball bearing 16 provides the connection between the shaft 12 and the wall 14; the shaft 12 drives a hub 17 shown in part that has rotor blades (not shown) extending therefrom, substantially in a horizontal plane 18.

Inside the shaft 12 there extends a mast 19 suitable for having a set of sensors (not shown) mounted at its top end, e.g. vision and telemetry sensors. The mast shown in FIGS. 1 and 2 comprises three main parts:

i) a mast foot comprising a tubular body 20 fitted at its bottom end with a flange 21 enabling the mast foot to be secured by means of screws 23 to a part 22 provided at the bottom of the gearbox 15;

ii) a second tubular part 24 engaged in the mast foot 20 and extending along a longitudinal axis 25 coinciding substantially with the axis 13 of the rotor shaft; the part 24 may be connected in rigid and reversible manner to the mast foot, by mutual engagement of four sets of splines, as described in detail below; and iii) a hollow spacer 26 secured to the top end of the part 24 by screws 27, surmounting the part 24 and presenting an upwardly-flared shape, being designed to support the sensors above the rotor.

This mast receives an electrical harness 28 fitted at each of its ends with a respective connector 29 or 30, and also a duct 31 fitted at each of its ends with a respective coupling 32 or 33.

The connector 30 and the coupling 33 are secured to the base of the part 24 beneath which they project, being designed to plug (connect) respectively in a complementary connector 34 and coupling 35 secured to the bottom of the MGB 15.

The connector 34 forms part of an electrical harness 36 whose other end is provided with another connector 37, while the coupling 35 forms part of a duct 38 whose other end is fitted with another coupling 39.

When connected by the connectors 30 and 34, the harnesses 28 and 36 serve to connect the sensors carried by the mast to equipment (not shown) on board the helicopter. In similar manner, the ducts 31 and 38 serve to couple said sensors to a fluid circuit via the couplings 33 and 35, e.g. a cooling fluid circuit.

The connector 34 and the coupling 35 are secured to the top end of a support 40 of bent shape, which is itself secured to the bottom of the MGB.

Figures 8, 9:
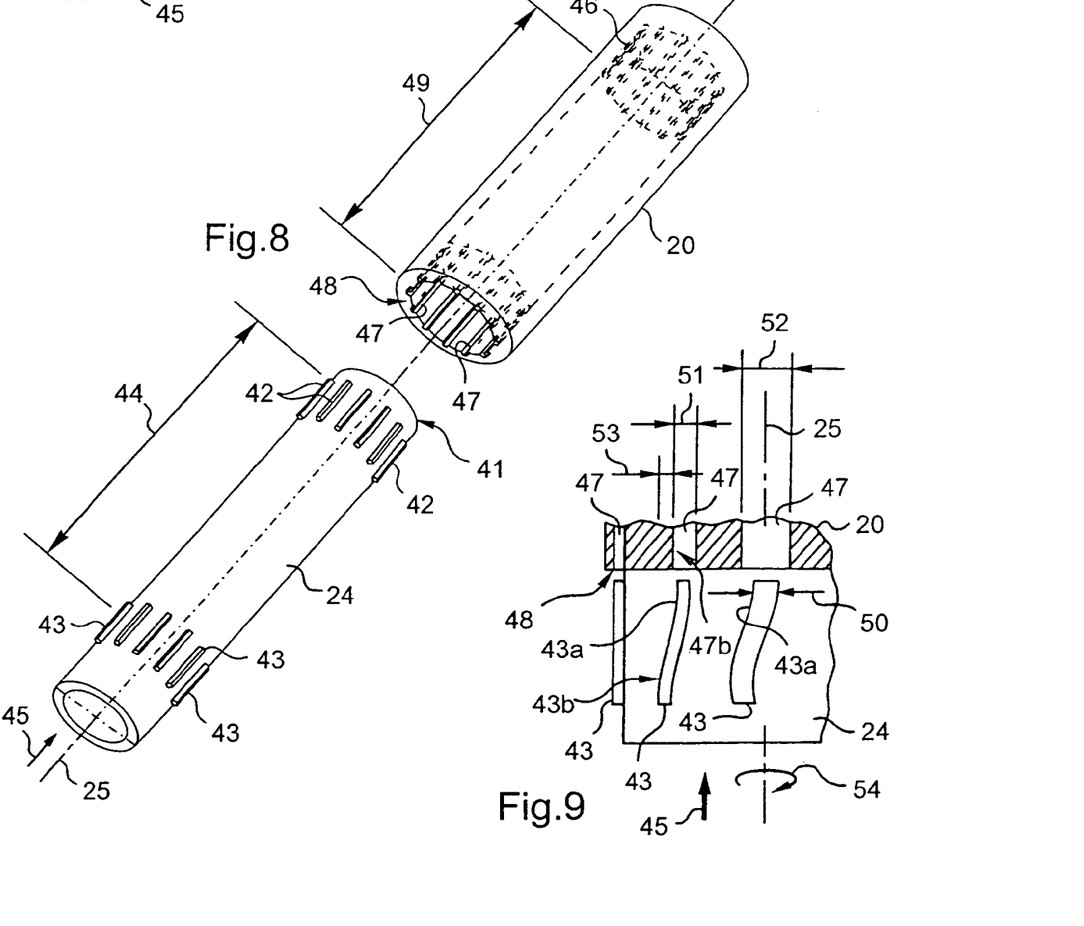

With reference to FIGS. 1, 2, 8, and 9, the part 24 is provided with an outer, first set of rectilinear splines 42 extending parallel to the axis 25 of the part 24 close to the bottom end 41 of said part; the part 24 also has an outer, second set of splines 43 extending at a distance from the splines 42, above said splines in the orientation of FIGS. 1 and 2, and "behind" the splines 42 relative to the direction 45 in which the part 24 is inserted into the part 20 (see FIG. 8).

The part 20 is provided with an inner, third set of rectilinear splines 46 extending parallel to the axis 25 of the part 20, and an inner, fourth set of rectilinear splines 47 extending at a distance from the splines 46 in the vicinity of the top end 48 of the mast foot 20, above the splines 46 relative to the orientation of FIGS. 1 and 2, and "behind" the splines 46 relative to the direction 45 along which the part 24 is inserted into the part 20 (cf. FIG. 8). The splines in the sets 46 and 47 is preferably in pair-wise alignment.

The profiles and the dimensions of the parts 20 and 24 and of the sets of splines 42, 46, and 47 are selected so that the splines 42 can slide with a small amount of clearance in the splines 47 and then in the splines 46 while the part 24 is being inserted into the mast foot 20.

Furthermore, the distance 44 between the "front" ends of the sets of splines 42 and 43 is longer than the distance 49 between the "rear" ends of the sets of splines 46 and 47, so as to make it possible, while engaging the part 24 in the part 20, to insert the splines 42 part way into the splines 46 before beginning to insert the splines 43 in the splines 47, corresponding to the parts 20 and 24 being substantially in the relative position as shown in FIGS. 1 and 9.

With reference to FIG. 9, the splines 43 situated furthest to the right in the figure present a width 50 that is greater than the width 51 of the gaps between the splines 47 other than the rightmost spline which is of greater width 52, which means that the splines 43 can be inserted into the splines 47 only when the parts 20 and 24 are in a predetermined relative angular position.

Furthermore, as described in greater detail with reference to FIGS. 3 to 7, an angular offset between the splines 43 and the splines 42 of the part 24 prevents the splines 43 being inserted fully into the splines 47 without causing the parts 20 and 24 to be deformed by twisting 54; in the configuration shown in FIG. 9 where the relative angular position of the parts 20 and 24 is determined by the mutual engagement of the sets of splines 42 and 46 with a small amount of clearance (cf. FIGS. 1 and 8), the rear side face 43b of each spline 43 is offset relative to the side face 47b of the corresponding spline 47 by a distance 53, and only the chamfered front ends 43a of the splines 43 can be freely inserted between the corresponding splines 47.

Turning (54) the rear portion of the part 24 about the axis 25 common to the parts 20 and 24 serves to eliminate this distance 53 and to enable the splines 43 to be inserted fully between the splines 47. This turning is preferably obtained by exerting thrust on the part 24 along the axis 25, and by the chamfered portions 43a of the splines 43 sliding with pressure against the ends of the splines 47.

This turning leads to twisting deformation of respective portions of the parts 20 and 24 that extends between the sets of splines, with respective amplitudes that depend on the relative elasticity of these portions. The amplitude of this turning may be of the order of one or more tenths of a milliradian, approximately; the axial thrust force needed to deform the parts 20 and 24 and to overcome friction in each of the paired sets of splines can be of the order of several thousand newtons.

Mounting of the removable portion 24, 26 of the mast in the mast foot 20 is completed firstly once the part 24 is engaged in the part 20, and secondly once the connectors 30 and 34 and the couplings 33 and 35 are mutually engaged.

In order to control the depth to which the part 24 penetrates in the mast foot 20, it is possible to use the harnesses 28, 36; for this purpose, it is possible to make a short circuit (or other impedance) connection between two terminals of the connector 37 of the harness 36, and then to measure the impedance between the two terminals of the connector 29 of the harness 28 which, once the connectors 30 and 34 are properly engaged, will be at the same potential as the terminals in question of the connector 37. Under such circumstances, until the connectors are properly engaged, the measured impedance is very large (theoretically infinite); the impedance becomes substantially zero once the connectors 30, 34 are mutually engaged.

In order to detect that the connectors 30 and 34 respectively associated with the two parts 24 and 20 are properly engaged with each other, it is also possible to connect to the terminals of the connector 29 a test device including an audible or visible indicator connected in series with a battery, as described in detail below.

With reference to FIGS. 1 and 2, the tooling used for exerting downward axial thrust on the parts 26 and 24 comprises a tubular sleeve 55 whose bottom end carries a flange 56 pierced by orifices enabling the sleeve to be secured on a part of the hub 17 by means of screws 57.

The sleeve 55 is engaged around the top end of the mast; the sleeve presents an outside thread on its upper portion suitable for co-operating with an inside thread provided in a cap 58 pierced by an orifice 59 through which the harness 28 and the duct 31 pass.

For assembly purposes, the mast 24, 26 is initially engaged in the mast foot 20 until the splines 43 come into contact with the splines 47; the mast is then turned so that the enlarged spline 43 penetrates (part-way) into the enlarged gap between the splines 47 (cf. FIG. 9).

The cap 58 is screwed onto the sleeve 55 until it bears against the top end of the part 26; further tightening of the screw causes the parts 24 and 26 to be pushed one into the other (along the axis 13, 25), with the splines 43 being engaged as a force-fit in the splines 47 and with the portions of the parts 20 and 24 that extend between the sets of splines being subjected to twisting.

Conversely, a mast 19 jammed in the mast root can be extracted by similar tooling that bears firstly on the hub 17 and secondly under a collar of the part 26, and then actuating the tooling to cause the part 26 to move upwards.

In an embodiment of the invention, the method of assembling the support 24, 26 "blind" on the rotor comprises the following operations in succession:

1) manually inserting the previously assembled-together parts 24, 26 into the inside of the shaft 12;

2) inserting and sliding downwards the splines 42 between the splines 47 until they become mutually disengaged, with the splines 42 then lying between the splines 47 and the splines 46;

3) turning the parts 24, 26 about the axis 25 so as to orient them visually in a position in which the spline 43 of greater width 50 is roughly in register with the gap of increased width 52 between the splines 47; starting from this position, the mutual orientation of the part 24 and 26 can be modified by small steps until a relative orientation is obtained for the parts 20 and 24 that enables the sets of splines 43 and 47 to engage mutually over a fraction of their length by sliding along the axis 25 until these two sets of splines "jam" mutually;

4) securing the tooling 55, 56 on the rotor hub and securing the cap 58 on the sleeve 55;

5) connecting an audible or visible indicator to two predetermined terminals of the connector 29;

6) connecting a short circuit across two corresponding predetermined terminals of the connector 37;

7) pushing the part 24 into the part 20 by screw-tightening the cap 58 until the indicator triggers as a result of mutual contact between the two corresponding terminals of the connectors 30 and 34;

8) in this position, identifying the extent to which the cap 58 has been moved along the axis 13, 25, and installing a mechanical abutment on the tooling 55, 56 facing the cap and at a predetermined distance therefrom; this distance corresponds to the mutual penetration distance needed by the connectors 30 and 34 to provide a proper connection;

9) pushing the part 24 over a final distance into the part 20 by screw-tightening the cap 58 until the cap comes into contact with the abutment;

10) disconnecting the indicator and the shunt; and 11) removing the cap 58 and the tooling 55, 56.

Where appropriate, operations 5) to 7) can be repeated for a second pair of predetermined terminals of the connector 29 and for a corresponding second pair of terminals of the connector 37, these terminals being connected by the conductors 28 and 36 to two pairs of terminals of the connectors 30 and 34 which come into mutual contact at a second depth of mutual engagement between the connectors 30 and 34 which is greater than the first depth of engagement of the connectors 30 and 34 that serves to close the first circuit having the indicator inserted therein; thus, the part 24 continues to be pushed into the part 20 until a second electrical circuit is closed by said second pairs of terminals making contact, this second closure leading to a second triggering of an indicator showing that the second mutual engagement depth of the connectors has been reached and that as a result the mutual engagement between the sets of splines 43 and 47, and also between the sets of splines 42 and 46 is sufficient to provide the required mechanical connection between the parts 20 and 24.

Furthermore, using a mechanical abutment in the operations 8) and 9) can be replaced by screw-tightening the cap through a predetermined angle of rotation that corresponds to the required amount of engagement.

The method of the invention makes it possible to guarantee that the connectors are interconnected in repeatable manner, it ensures that the pins have reached their minimum engagement for avoiding possible disconnection due to the vibration generated by the rotor and traveling throughout the structure of the aircraft, and it enables the operator to be sure of not destroying the connection system at the end of the tube by forcing engagement over too great a distance.

In the variant embodiment shown in FIGS. 3 to 7, the side faces 60*a*, 60*b* of a groove 60 opening out into the end face 48 of the tubular structure 20 receiving the mast 24 are parallel to the longitudinal axis 25 of said structure; these faces extend along two generator lines of a first cylinder corresponding to the inside wall 20*a* of the tubular structure; the respective projections of these two generator lines onto a plane orthogonal to the longitudinal axis of the cylinder form a first angle at the center 61.

In this variant, the two respective projections of the faces 62*a*, 63*a* of projections 62, 63 from the mast 24 (forming said two twist abutments) form a second angle at the center 64 in a plane orthogonal to the longitudinal axis of the tubular portion of the mast, this second angle being of a value that is greater than the value of the first angle at the center 61: these two faces are tangential to two generator lines of a second cylinder corresponding to the shape of the outside face 24*a* of the tubular portion 24 of the mast.

The diameter of the second cylinder is slightly smaller than that of the first cylinder in order to enable the tubular portion between the abutments 62 and 63 of the mast foot 24 to slide inside the tubular structure 20.

Figures 3, 4, 5, 6:
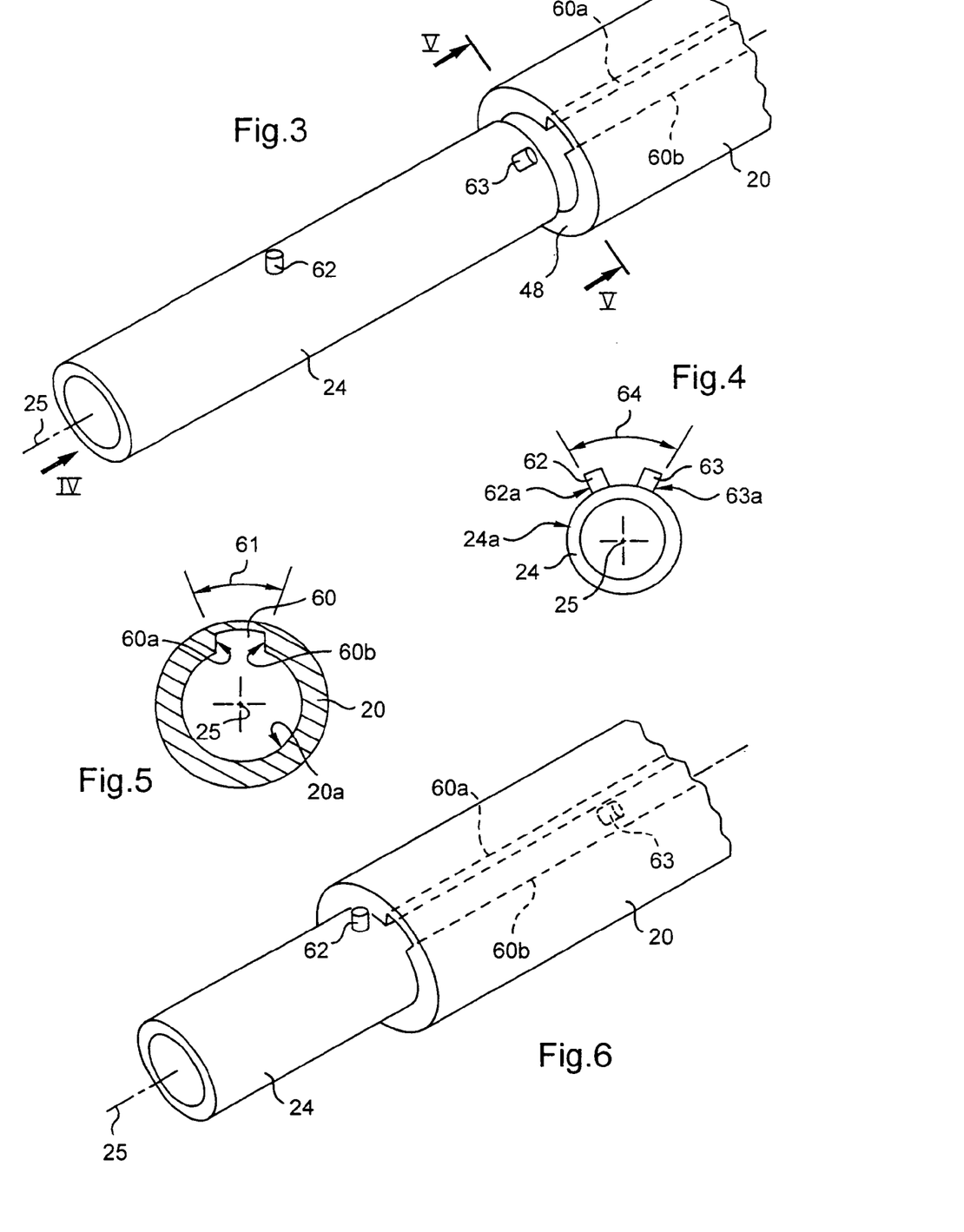
Figure 7:
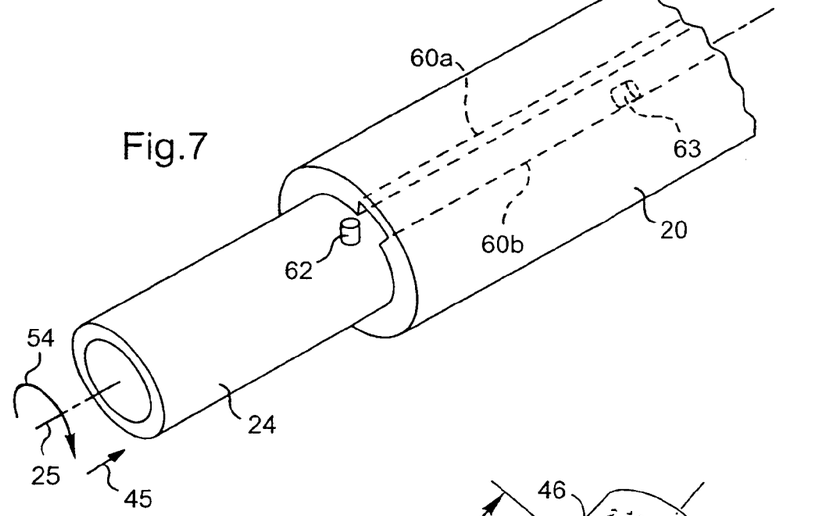
FIG. 7 is a perspective view showing the partial mutual engagement of the two parts after they have been subjected to mutual stress in twisting.

In this variant, the bottom portion of the mast, including the twist abutment 63—or first abutment—that is closest to the bottom end of the mast can be inserted in and can slide along the tubular structure for receiving the bottom of the mast; in this configuration shown in FIGS. 3 and 6, the abutment 63 can slide freely along the groove 60 in the tubular structure 20.

This sliding is limited in amplitude by the second twist abutment 62 of the bottom of the mast 24 coming into abutment against the end 48 of the tubular sleeve 20 that receives the bottom of the mast: because the second angle 64 is slightly greater than the first angle 61, this abutment 62 cannot penetrate into the groove of the tubular structure.

In accordance with an aspect of the invention, this penetration is made possible by deformation in twisting 54 (cf. FIG. 7) about the longitudinal axis 25 of the tubular portion at the bottom of the mast, with the portion that extends between the two twist abutments being the portion that is subjected to deformation; this deformation in twisting occurs in the direction that reduces the value of said second angle until its value becomes equal to or less than the value of the first angle; in this configuration in which the bottom of the mast 24 is prestressed in twisting, the sliding of the bottom of the mast inside the tubular structure 20 is continued until the desired depth of engagement is reached; in this configuration, with the mast engaged in the sheath, the portion of the bottom of the mast that is prestressed in twisting serves as return means towards a "free" configuration in which said generator lines of the abutments of the bottom portion of the mast define said second angle of value greater than said first angle.

Amongst the possible variants of the invention, the following should-be noted:

the twist abutments 62, 63 secured to the mast may extend along two distinct generator lines that are not in alignment; conversely, these abutments may be aligned along a common generator line; in which case, at least one of the side bearing faces of the groove formed in the structure receiving the mast does not extend parallel to the longitudinal (engagement) axis that is common to both parts, but presents at least a portion that is inclined relative to said axis, e.g. a portion that is helical about said axis;

the abutments can be in other positions; for example a longitudinal rib may be provided on the outside face 24a of the tubular portion 24 at the bottom of the mast, while said projecting twist abutments are provided on the inside face 20a of the sheath 20 receiving the mast; in another variant, the bottom of the mast 24 may fit over the tubular structure 20 that is secured to the MGB or to the fuselage; in which case the abutments are provided respectively on the inside face of the tubular mast and on the outside face of the tubular structure secured to the MGB or the fuselage;

the portion deformable in twisting and/or the twisting return means may, at least in part, be secured to or integral with the bottom of the mast 24; they may also be at least secured to or integral with the tubular structure 20 that is secured to the MGB or the fuselage; and a portion that is deformable in twisting and integrated in the mast or the structure receiving it may present "local" stiffness in twisting with a value that is less than that of the portions of the mast (or of the structure) disposed on either side of said portion of smaller twisting stiffness; this portion with smaller twisting stiffness may be in the form of a tubular wall of-smaller thickness compared with the zones on either side thereof; this tubular wall may present zones weakened by through openings in the tubular wall.

What is claimed is:

1. A support (20, 24, 26) for a stationary article surmounting a helicopter rotor (11), which support comprises a hollow structure presenting a longitudinal axis (25), wherein the hollow structure comprises two hollow parts (20, 24) of elongate shape along said longitudinal axis that are designed to be engaged one in the other and to be mutually stressed in twisting along said common longitudinal axis, and wherein two projections (62, 63), ribs or splines having pairs of respective side faces (62a, 63a) forming said twist abutments are provided on the outside portion (24a) of the first hollow part (24), these abutments being spaced apart along the longitudinal axis, and return means in rotation about the longitudinal axis are integrated in the first hollow part and disposed between said two abutments.

2. A support according to claim 1, in which a first hollow part (24) has two twist abutments (42, 43, 62, 63) designed to co-operate respectively with two complementary twist abutments (46, 47, 60a, 60b) secured to a second hollow part (20), when in an assembly configuration of the support in which said two parts are mutually stressed in twisting and are secured to each other by mutual contact between the twist abutments in pairs, the support further comprising return means designed to cause relative rotation of the twist abutments of at least one of the two parts.

3. A support according to claim 1, in which the two complementary twist abutments are formed by side faces (60a, 60b) of at least one depression, groove, or slot (60) provided in the inside portion (20a) of the (tubular) second hollow part or sleeve (20) which is suitable for receiving the first hollow part, and rotary return means are provided between said two complementary abutments.

4. A support according to claim 1, and comprising:

a first portion (24, 26) separable from the fuselage and the rotor of the helicopter, comprising a first tubular portion (24) presenting on its outside face both a first set of splines (42) and a second set of splines (43) separated from the first set by a first distance measured along the longitudinal axis, together with a first tubular portion extending between said two sets of splines and presenting first elasticity in twisting along the longitudinal axis;

a second portion (20) designed to be permanently connected to the fuselage of the helicopter, which comprises a second hollow tubular part or portion (20) presenting on its inside face both a third set of splines (46) and a fourth set of splines (47) separated from the third set by a second distance measured along the longitudinal axis, together with a second tubular portion extending between said two sets of splines and presenting second elasticity in twisting about the longitudinal axis; and said first and second distances enabling the first and third sets of splines to be mutually engaged and also enabling the second and fourth sets of splines to be mutually engaged in a configuration of mutual stress between the first and second parts.

5. A support according to claim 4, in which the respective diameters of the two parts and their two sets of splines, the length of said parts and of the sets of splines, and also the sections and the angular offsets of the splines are designed to enable the first part to be partially engaged in the second part by the first set of splines (42) sliding freely in the third and fourth sets of splines (46, 47)

6. A support according to claim 4, in which the angular offset (53, 64) of at least a portion (43b) of the splines in the second set of splines (43) prevents the second set of splines from sliding in the fourth set of splines (47) so long as said first and second tubular portions are not (elastically) deformed—and stressed—in twisting (54) along their common longitudinal axis by an amount that enables said offset to be compensated.

7. A support according to claim 4, in which the first elasticity is greater than the second elasticity so as to favor deformation in twisting of the first part while it is being engaged by force in the second part.

8. A support according to claim 4, in which the sets of splines (42, 43, 46, 47) are elongate in shape along the longitudinal axis, at least one spline in the second set of splines presenting a chamfer (43a) at its longitudinal end closer to the splines of the first set.

9. A support according to claim 1, in which a mechanical angular key or index (43, 47, 50, 52, 60, 63) is incorporated in the two hollow parts so as to allow them to be mutually engaged in only one determined relative angular position.

10. A helicopter comprising a rotor (11), a hollow shaft (12) serving to drive the rotor, said shaft extending at least in part inside a gearbox (15) connecting the rotor to an engine, and an elongate support for a stationary device surmounting the rotor, which support comprises a hollow structure presenting a longitudinal axis and extending, at least in part, inside the hollow shaft, said hollow structure receiving an electrical harness (28) or a fluid transport duct (31), wherein the support (20, 24, 26) comprises a hollow structure presenting a longitudinal axis (25), wherein the hollow structure comprises two hollow parts (20, 24) of elongate shape along said longitudinal axis that are designed to be engaged one in the other and to be mutually stressed in twisting along said longitudinal axis.

11. A helicopter according to claim 10, in which the hollow structure comprises a first hollow part (24) and a second hollow part (20), the first hollow part (24) having two twist abutments (42, 43, 62, 63) designed to co-operate respectively with two complementary twist abutments (46, 47, 60a, 60b) secured to the second hollow part (20), when the two hollow parts are mutually stressed in twisting and are secured to each other by mutual contact between the twist abutments in pairs.

12. A helicopter according to claim 11, in which the support further comprises return means designed to cause relative rotation of the twist abutments of at least one of the two hollow parts.

13. A helicopter according to claim 12, in which the return means are integrated in the first hollow part and disposed between said two abutments.

14. A helicopter according to claim 10, in which two projections (62, 63), ribs or splines having pairs of respective side faces (62a, 63a) forming said twist abutments are provided on the outside portion (24a) of the first hollow part (24), these abutments being spaced apart along the longitudinal axis.

15. A support according to claim 10, and comprising:
- a first portion (24, 26) separable from the fuselage and the rotor of the helicopter, comprising a first tubular portion (24) presenting on its outside face both a first set of splines (42) and a second set of splines (43) separated from the first set by a first distance measured along the longitudinal axis, together with a first tubular portion extending between said two sets of splines and presenting first elasticity in twisting along the longitudinal axis;
- a second portion (20) designed to be permanently connected to the fuselage of the helicopter, which comprises a second hollow tubular part or portion (20) presenting on its inside face both a third set of splines (46) and a fourth set of splines (47) separated from the third set by a second distance measured along the longitudinal axis, together with a second tubular portion extending between said two sets of splines and presenting second elasticity in twisting about the longitudinal axis; and
- said first and second distances enabling the first and third sets of splines to be mutually engaged and also enabling the second and fourth sets of splines to be mutually engaged in a configuration of mutual stress between the first and second parts.

16. A method of mounting a support (20, 24, 26) for a stationary article surmounting a helicopter rotor (11), which support comprises a hollow structure presenting a longitudinal axis (25), wherein the hollow structure comprises two hollow parts (20, 24) of elongate shape along said longitudinal axis that are designed to be engaged one in the other and to be mutually stressed in twisting along said common longitudinal axis, the method comprising:
- engaging by force the first hollow part in the second hollow part by exerting a thrust force (45) along the common longitudinal axis (25) of said parts, bearing against the rotor, and
- when mutual engagement is detected of two connectors (30, 34) or couplings (33, 35) that are connected respectively to the two parts, ceasing to apply the thrust force.

17. A method according to claim 16, in which an audible or visible indicator is connected to an external connector (29) of a harness (28) extending inside the hollow structure, and a short circuit is connected to a connector (37) of a corresponding harness (36) of the helicopter, and thrust ceases to be applied when the indicator triggers because an electric circuit has been closed by the first two pairs of terminals of the two connectors (30, 34) making contact.

18. A method according to claim 17, in which the first part continues to be pushed into the second part until a second electric circuit is closed by two second pairs of terminals of the two connectors (30, 34) making contact.

19. A method according to claim 17, in which the first part continues to be pushed into the second part until an abutment makes contact, and/or along a predetermined engagement distance.

* * * * *

UNITED STATES PATENT AND TRADEMARK OFFICE
CERTIFICATE OF CORRECTION

PATENT NO. : 7,641,447 B2
APPLICATION NO. : 11/594192
DATED : January 5, 2010
INVENTOR(S) : Cravero et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Twenty-first Day of December, 2010

David J. Kappos
*Director of the United States Patent and Trademark Office*